US010535901B2

(12) United States Patent
Steingart et al.

(10) Patent No.: US 10,535,901 B2
(45) Date of Patent: Jan. 14, 2020

(54) ALKALINE BATTERY ELECTROLYTE USEFUL FOR A RECHARGEABLE ALKALINE ELECTROCHEMICAL CELL

(71) Applicants: The Trustees of Princeton University, Princeton, NJ (US); The Regents of the University of California, Oakland, CA (US)

(72) Inventors: Daniel Steingart, Princeton, NJ (US); Benjamin Hertzberg, New York, NY (US); Mylad Chamoun, Princeton, NJ (US); Greg Davies, Princeton, NJ (US); Ying Shirley Meng, San Diego, CA (US)

(73) Assignees: THE TRUSTEES OF PRINCETON UNIVERSITY, Princeton, NJ (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/560,599

(22) PCT Filed: Apr. 5, 2016

(86) PCT No.: PCT/US2016/025989
§ 371 (c)(1),
(2) Date: Sep. 22, 2017

(87) PCT Pub. No.: WO2016/164338
PCT Pub. Date: Oct. 13, 2016

(65) Prior Publication Data
US 2018/0083320 A1    Mar. 22, 2018

Related U.S. Application Data

(60) Provisional application No. 62/143,439, filed on Apr. 6, 2015.

(51) Int. Cl.
*H01M 10/26* (2006.01)
*H01M 10/44* (2006.01)
(Continued)

(52) U.S. Cl.
CPC ............. *H01M 10/26* (2013.01); *H01M 4/38* (2013.01); *H01M 10/44* (2013.01); *H01M 2004/028* (2013.01); *H01M 2300/0014* (2013.01)

(58) Field of Classification Search
None
See application file for complete search history.

(56) References Cited

U.S. PATENT DOCUMENTS 5,011,752 A    4/1991 Kordesch et al.
2006/0204844 A1*  9/2006 Costanzo ............ H01M 2/1686
                                                429/206

(Continued)

FOREIGN PATENT DOCUMENTS

EP    2777090 B1    2/2016
FR    2982427 A1    5/2013

(Continued)

OTHER PUBLICATIONS

International Search Report for corresponding application PCT/US2016/025989 dated Jun. 8, 2016.

(Continued)

*Primary Examiner* — Daniel S Gatewood
(74) *Attorney, Agent, or Firm* — Norris McLaughlin, PA

(57) ABSTRACT

The invention provides an electrolyte composition which is adapted for use in a rechargeable alkaline electrochemical cell, and especially preferably adapted for use in a rechargeable manganese zinc electrochemical cell, which electrolyte composition imparts improved performance characteristics to the rechargeable alkaline electrochemical cell. The elec- (Continued)

trolyte composition includes an electrolyte composition in which contains a potassium hydroxide and lithium hydroxide in a concentration and a respective molar ratio of about 1 molar potassium hydroxide to 2.5-3.7 (preferably 1:3) molar lithium hydroxide (1 M KOH:2.5-3.7 M LiOH). Also provided are alkaline electrochemical cells and alkaline batteries comprising the electrolyte compositions. The resultant alkaline electrochemical cells and alkaline batteries exhibit improved performance characteristics, as the electrolyte composition significantly inhibits the passivation of Zn, and may also be useful in this role in other battery chemistries.

15 Claims, 13 Drawing Sheets

(51) Int. Cl.
*H01M 4/38* (2006.01)
*H01M 4/02* (2006.01)

(56) References Cited

U.S. PATENT DOCUMENTS

2012/0009465 A1* 1/2012 Kato ............... H01M 2/0235
429/166
2015/0140453 A1* 5/2015 Stevens ............ H01M 12/06
429/405

FOREIGN PATENT DOCUMENTS

| JP | S556740 A | 1/1980 | | |
|---|---|---|---|---|
| TW | 466789 B | 12/2001 | | |
| WO | 2013068694 A1 | 5/2013 | | |
| WO | WO-2013068694 A1 * | 5/2013 | ............ | H01M 12/06 |

OTHER PUBLICATIONS

Written Opinion of the International Searching Authority for corresponding application PCT/US2016/025989 dated Jun. 8, 2016.
International Preliminary Report on Patentability for corresponding application PCT/US2016/025989 dated Oct. 10, 2017.
Written Opinion on the International Searching Authority for corresponding application PCT/US2016/025989 dated Oct. 10, 2017.

* cited by examiner

ALKALINE BATTERY ELECTROLYTE USEFUL FOR A RECHARGEABLE ALKALINE ELECTROCHEMICAL CELL

The present application claims priority to and fully incorporates by reference the disclosure of U.S. Ser. No. 62/143,439, filed on 6 Apr. 2015.

This invention was made with government support under Grant No. DE-AR0000400 awarded by the U.S. Department of Energy, Advanced Research Projects Agency-Energy (ARPA-E). The government has certain rights in the invention.

Rechargeable electrochemical cells which contain an alkaline electrolyte are well known, and currently are in wide use. Such cells find use in a multitude of applications and devices and are useful in powering both static and portable devices and installations. Provision of rechargeable alkaline electrochemical cells with improved performance characteristics, i.e., an increased depth of discharge per charge/discharge cycle and/or increased number of charge/discharge cycles attained while retaining acceptable voltage and current output characteristics would be highly advantageous in a plethora of applications. Such would improve the performance characteristics of existing (and expected future) devices which utilize such rechargeable alkaline electrochemical cells in permitting, i.e., a longer service life for any battery or battery pack and/or reduced number of batteries or battery packs required for a comparable power output requirement. However, present rechargeable alkaline electrochemical cells are however not without shortcomings such diminishing charge/discharge capacity of such cells which typically decrease over multiple charge/discharge cycles thus shortening the service life of the rechargeable alkaline electrochemical cells. Also, present rechargeable alkaline electrochemical cells have a limited depth of discharge ("DoD") with each charge/discharge cycle of the cells, which also tends to deteriorate and diminish over multiple charge/discharge cycles. Such effects are typically concurrent and each individually deteriorates the performance of such rechargeable alkaline electrochemical cells, diminishing the overall charge/discharge capacity of a cell during a single such cycle and also diminishes the total number of useful charge/discharge cycles which can be obtained from a cell while maintaining acceptable performance characteristics, i.e. power output characteristics.

The present invention addresses and overcomes various shortcomings in prior art rechargeable alkaline electrochemical cells.

In one aspect the present invention provides an electrolyte composition which is adapted for use in a rechargeable alkaline electrochemical cell (secondary cell), and preferably adapted for use in a rechargeable manganese zinc electrochemical cell, which electrolyte composition imparts improved performance characteristics to the rechargeable alkaline electrochemical cell.

In a further aspect there is provided an alkaline battery or alkaline electrochemical cell, which comprises at least an electrolyte composition which imparts improved performance characteristics to the alkaline battery.

In another aspect the present invention provides an alkaline battery or alkaline electrochemical cell, which comprises an electrolyte composition which imparts improved depth of discharge ("DoD") performance characteristics to the alkaline battery. DoD refers to the measure of how much energy has been withdrawn from a battery or cell, often expressed as a percentage of capacity, e.g., rated capacity. For example, a 100 Ah battery from which 30 Ah has been withdrawn has undergone a 30% depth of discharge (DOD).

In a still further aspect, the present invention provides an alkaline battery or alkaline electrochemical cell which comprises an electrolyte composition which imparts improved performance characteristics over a plurality of charge/discharge cycles.

In a still further aspect, the present invention provides an alkaline battery or alkaline electrochemical cell which comprises an electrolyte composition which imparts improved performance characteristics according to one or more of the foregoing aspects, wherein the alkaline battery or alkaline electrochemical cell contains a manganese containing electrode.

In a still further aspect, the present invention provides an alkaline battery or alkaline electrochemical cell which comprises an electrolyte composition which imparts improved performance characteristics according to one or more of the foregoing aspects, wherein the alkaline battery or alkaline electrochemical cell contains a zinc containing electrode.

In a yet further aspect the present invention provides a method for improving the performance of a rechargeable alkaline electrochemical cell which method comprises the step of: providing to, or including in the construction of the rechargeable alkaline electrochemical cell an electrolyte composition which imparts improved performance characteristics to the rechargeable alkaline electrochemical cell.

In a still further aspect, the present invention provides a method for increasing the service life of a rechargeable alkaline electrochemical cell which method comprises the step of:

providing to, or including in the construction of the rechargeable alkaline electrochemical cell an electrolyte composition which imparts improved performance characteristics to the alkaline battery.

In a yet further aspect, the present invention provides method for increasing the depth of discharge (DoD) of a rechargeable alkaline electrochemical cell which comprises the step of: providing to, or including in the construction of the rechargeable alkaline electrochemical cell an electrolyte composition which imparts improved depth of discharge performance characteristics to the alkaline battery.

In a yet further embodiment the present invention provides an electrolyte composition adapted for use in alkaline electrochemical cells which substantially reduces or significantly eliminates the formation of $ZnMn_2O_4$ within the electrochemical cell, particularly wherein the alkaline electrochemical cells are rechargeable and/or are comprised in alkaline batteries of the rechargeable type.

In a still further aspect there is provided a an electrolyte composition adapted for use in alkaline electrochemical cells which substantially reduces or significantly eliminates the zinc poisoning and/or the zinc passivation failure modes for this type of electrochemical cell, particularly wherein the alkaline electrochemical cells are rechargeable and/or are comprised in alkaline batteries of the rechargeable type.

In a further aspect of the invention there is provided a process for charging an electrochemical cell comprising a cathode comprising a cathode active material comprising manganese; an anode comprising Zn; and an electrolyte composition which substantially reduces or significantly eliminates the formation of $ZnMn_2O_4$ within the electrochemical cell.

In a yet further aspect the invention provides methods for charging an alkaline electrochemical call or an alkaline battery which method includes the step of: charging the alkaline electrochemical call or an alkaline battery at an initial rate for a first cycle which is different from the rate used to charge the alkaline electrochemical call or an alkaline battery in subsequent cycles.

Figure 3A:
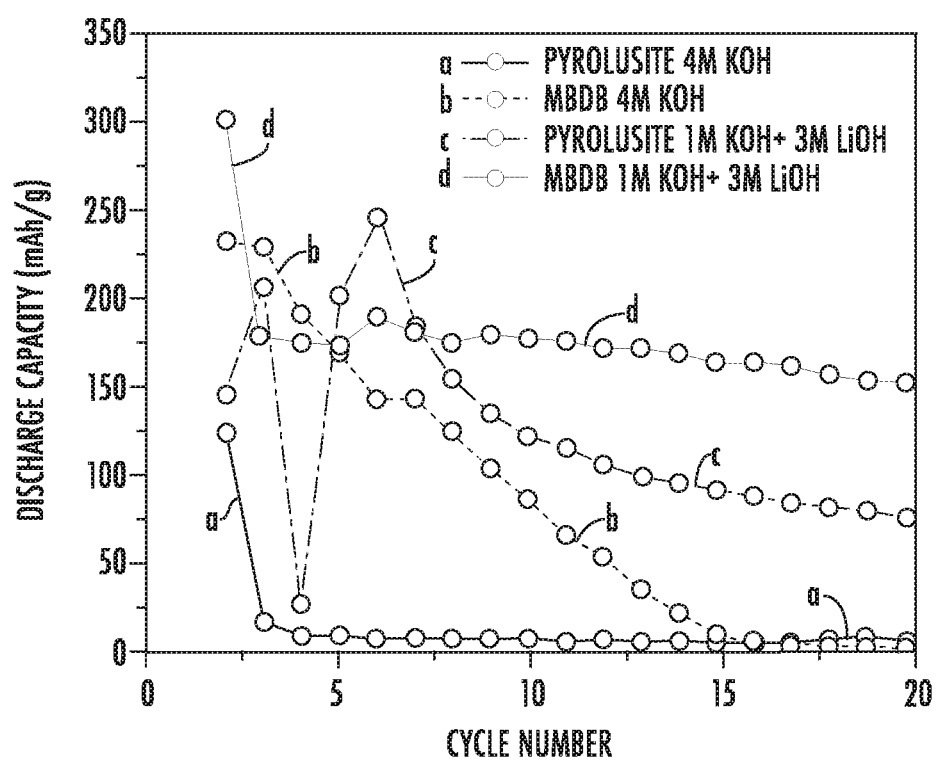
Figure 3B:
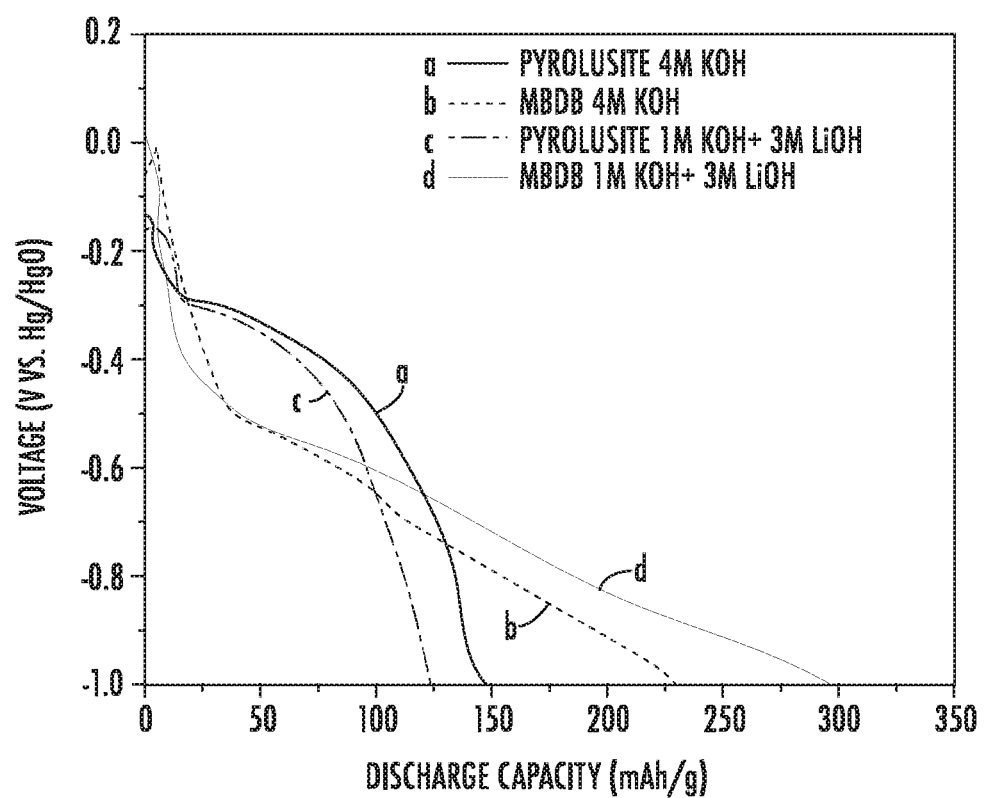

FIGS. 3(a) and 3(b) depict the results of a galvanostatic analysis of the first discharge of $MnO_2$ cycled with Bi dopants (MBDB) and without (pyrolusite) and in both pure KOH and in 1M KOH+3M LiOH electrolyte solutions.

Figure 4:
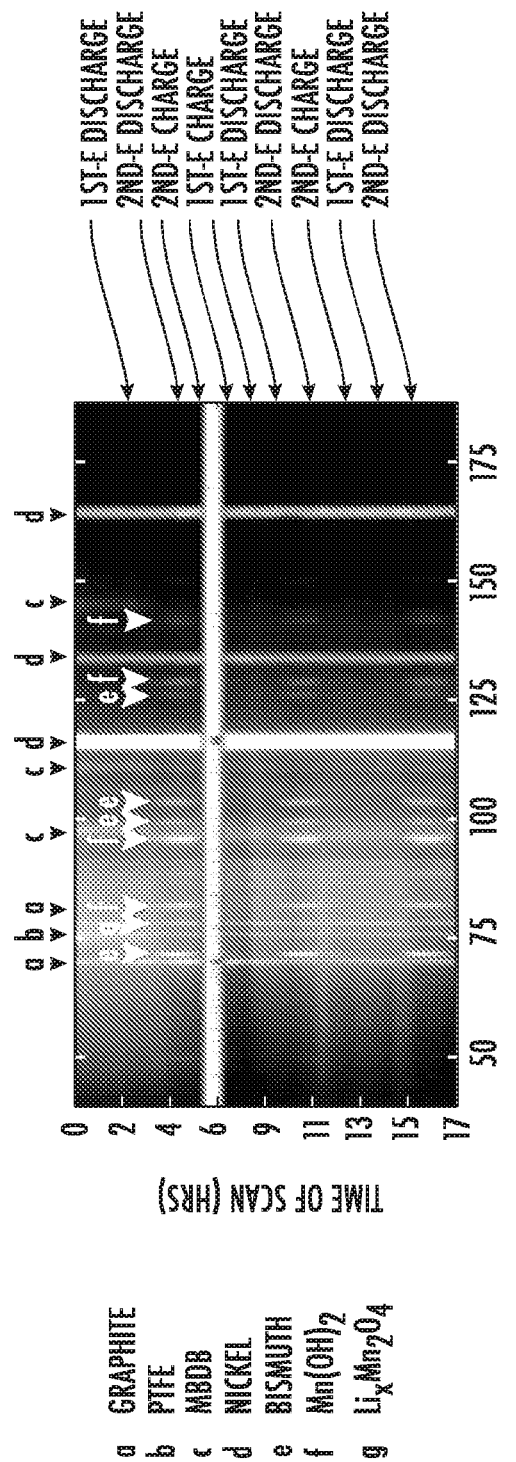

FIG. 4 depicts the results of an EDXRD analysis of the effects of this mixed electrolyte on the microstructural changes occurring within a $MnO_2$ cathode.

Figure 5:
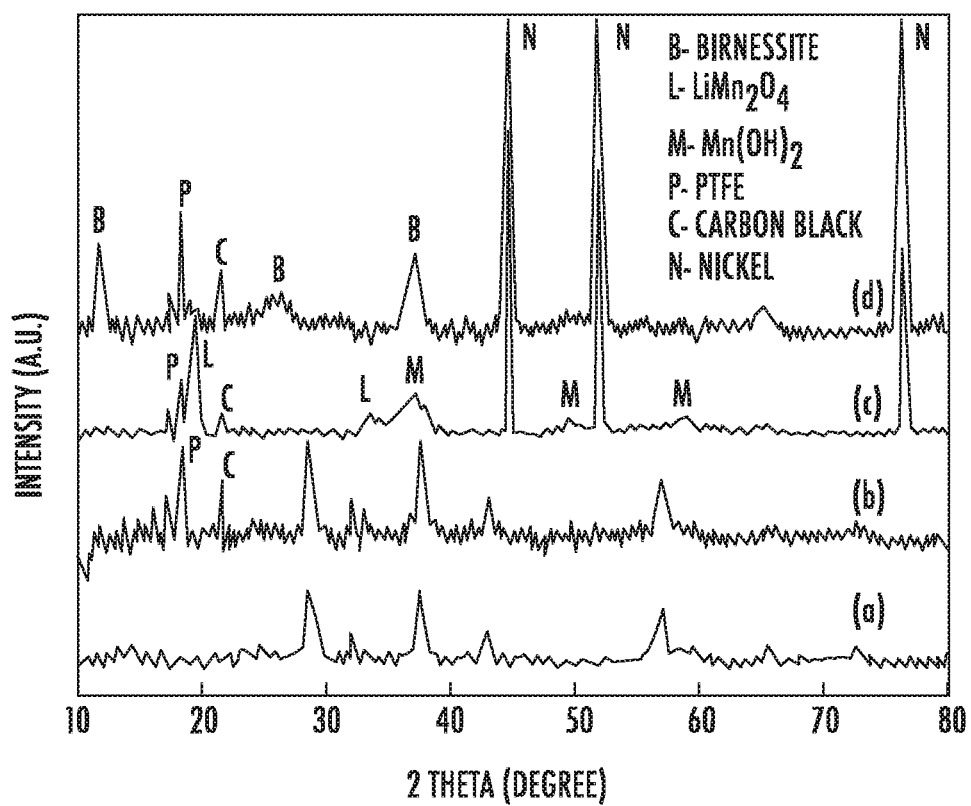

FIG. 5 depicts the results of an analysis of an ex-situ XRD patterns of structural evolution of the MBDB composite electrodes with carbon black conductive additives in 1M KOH+3M LiOH at various states of discharge.

Figure 6:
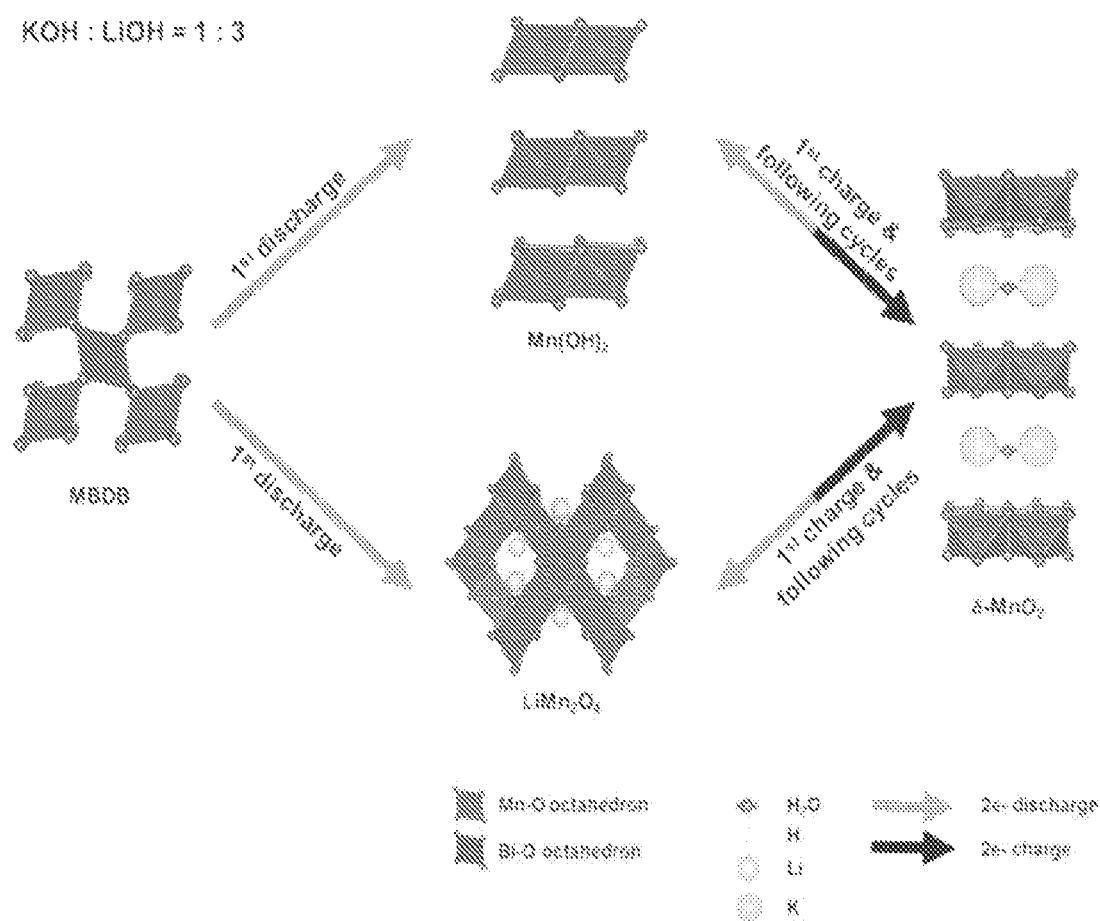

FIG. 6 depicts a schematic illustration of the expected structural transformations occurring in the MBDB material when cycled in a 1M KOH+3M LiOH containing electrolyte composition.

Figure 7:
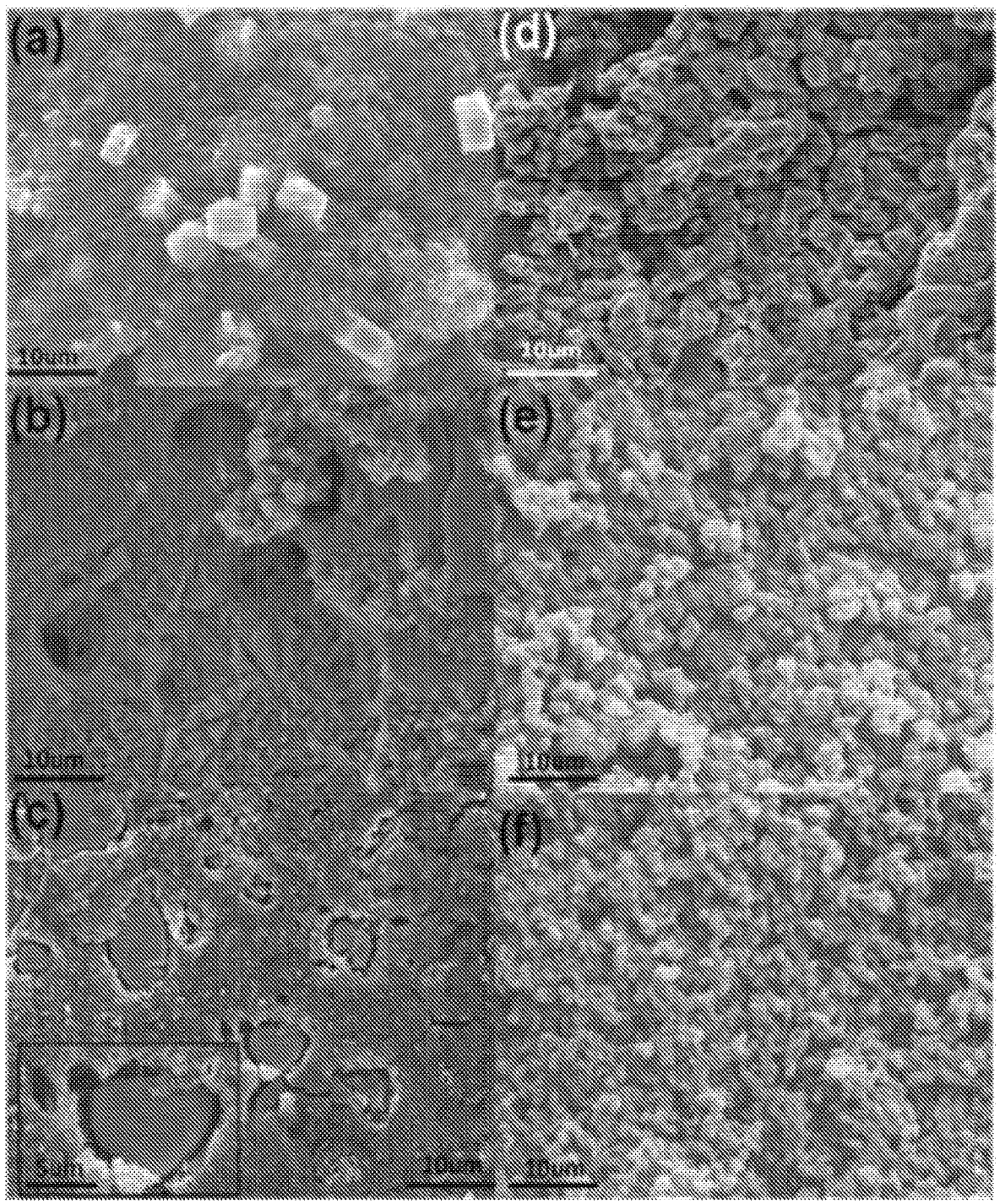

FIG. 7 depicts SEM micrographs demonstrating the change of morphology for MBDB electrodes with 4M KOH electrolyte at various points in a discharge/recharge process or protocol.

Figure 8:
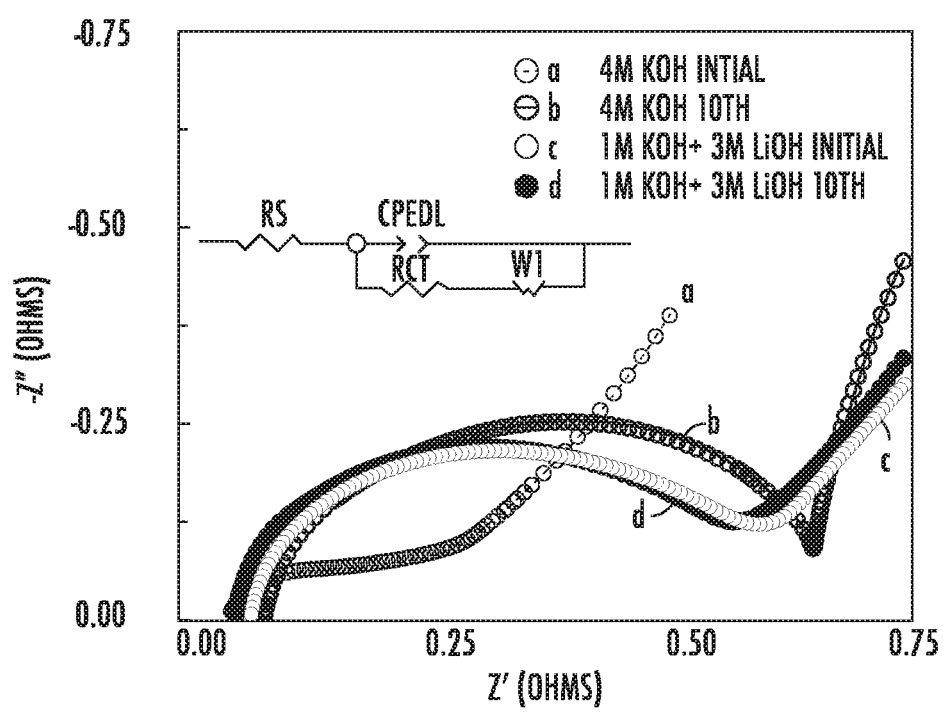

FIG. 8 depicts electrochemical impedance spectroscopy (EIS) measurements were performed with certain three-electrode cell configurations.

The inventors have surprisingly found that the operating characteristics of an alkaline electrochemical cell, preferably where such is of the rechargeable type, which are improved by the use of, or the inclusion of an electrolyte composition in which contains an electrolyte having a concentration of potassium hydroxide and lithium hydroxide in a limited ratio or proportion of about 1 molar potassium hydroxide to 2.5-3.7 molar lithium hydroxide (1 M KOH:2.5-3.7 M LiOH). Particularly preferably concentrations and respective molar ratios of potassium hydroxide:lithium hydroxide (KOH:LiOH) in the electrolyte are (in order of increasing preference) at least: 1:2.55, 1:2.6, 1.2:65, 1:2.7, 1:2.75, 1:2.8, 1:2.85, 1:2.9, 1:2.95 and most preferably is 1:3. Concurrently, particularly preferably the respective molar ratios of respective molar ratios of potassium hydroxide: lithium hydroxide (KOH:LiOH) in the electrolyte is (in order of increasing preference) at not in excess of: 1:3.65, 1:3.6, 1:3.55, 1:3.5, 1:3.45, 1:3.4, 1:3.35, 1:3.3; 1:3.25, 1:3.2, 1:3.15, 1:3.1, 1:3.05 and most preferably is 1:3.

Additionally to the foregoing, particularly preferably, the difference of the balance of molarity of the KOH:LiOH is not more than 0.25 moles (0.25 M) between the KOH and LiOH present in the electrolyte, and in order of increasing preference, not more than 0.2M, 0.175M. 0.15M, 0.125M, 0.1M, 0.075M, 0.05M, 0.025M and 0.01M.

The inventors had surprisingly found that the use an electrolyte composition (i.e., an electrolyte composition) which comprises both potassium hydroxide and lithium hydroxide in the limited ratios or proportions discussed above, and preferably in the preferred respective molar ratios or proportions provided unexpected improvements to the operating performance of alkaline electrochemical cells.

It is believed that the electrolyte compositions of the invention eliminates the Zn poisoning failure mechanism from Zn electrode containing alkaline electrochemical cells and alkaline batteries containing such electrodes, and in particular reduces or eliminates the Zn poisoning failure mechanism an battery which comprises an manganese containing electrode, enabling this type of battery chemistry to be recharged and cycled repeatedly to a great depth of discharge than previously possible, with a DoD of the $2^{e-}$ capacity of $MnO_2$ on the order of 50%, 60%, 70%, 75%, 80%, and even greater (i.e., of 360 mAh/g (60% of the $2^{e-}$ capacity of $MnO_2$), a substantial improvement over electrolytes commonly used in this type of battery. It is believed that the use of the electrolyte compositions of the invention significantly reduce and in some instances may substantially eliminate the formation of $ZnMn_2O_4$, especially as compared to a like alkaline electrochemical cell or like alkaline electrochemical battery which however includes an electrolyte composition which does not fall within recited limitations of respective molar concentration of KOH and LiOH within the electrolyte. Such relative performance may be established over a plurality of charge/discharge cycles, e.g, 25, 50 or more charge/discharge cycles in order to determine the degree of formation of $ZnMn_2O_4$, which an alkaline electrochemical cell or an alkaline electrochemical battery of the invention preferably demonstrates a reduction of at least 75%, but preferably (and in order of increasing preference) at least 80%, 85%, 90%, 92.5%, 95%, 97.5%, 98%, and 99% as compared to the like battery, under like charge/discharge cycles and conditions.

Adding LiOH to the KOH electrolyte has little effect on the overall resistance of the cell to Zn poisoning unless the LiOH:KOH ratio is in the preferred molar ratios, and most desirable is a precise molar ratio of 3:1. In this case, the loss of capacity that would normally be attributed to the formation of $ZnMn_2O_4$ is negated entirely, resulting in a dramatically improved overall capacity and cyclability. A current hypothesis is that, at the correct KOH:LiOH ratio, the formation of $LiMn_2O_4$ becomes thermodynamically favorable compared to $ZnMn_2O_4$ formation. While the formation of $ZnMn_2O_4$ is irreversible, $LiMn_2O_4$ can be fully reduced to $Mn(OH)_2$ and oxidized to $\lambda$-$MnO_2$, a spinel polymorph of $MnO_2$. This dramatically improves the overall cyclability of the cell. Using a slower rate (an initial C/20 rate for the first cycle followed by a C/4.2 rate for subsequent cycles) further improves both the capacity and cyclability of the cell. It is believed that this is due to the aggregation effect previously noted to occur in the cathode during cycling—the overall particle size increases drastically during cycling, causing the ionic conductivity of the cathode to drop. While $\delta$-$MnO_2$ is a reasonably effective proton conductor, $\lambda$-$MnO_2$ may very well be a poor one, as spinel structures are well known to have poor ionic conductivity. Using a slow rate, especially on the first cycle when the aggregation effect is at its most dramatic, reduces the size of the aggregated cathode active material and reduces the impact on cell performance of the poor conductivity of the $\lambda$-$MnO_2$. Altering the total hydroxide concentration of the electrolyte does not affect the Zn poisoning resistance of the cell as long as the required KOH:LiOH ratio is maintained, but it does have an effect on overall capacity. However, reducing the electrolyte concentration, e.g., to 0.5M KOH+1.5M LiOH reduces capacity significantly, presumably due to a reduction in the concentration of hydroxyl ions to critical levels, due to the nature of LiOH as a weaker/less soluble base than KOH. Conversely, increasing total hydroxide concentration to 1.5M KOH+4.5M LiOH also reduces total capacity, possibly due to a lack of free water in the electrolyte, since LiOH dissolution requires a high water of solvation.

The inventive electrolyte compositions taught herein also significantly inhibit the passivation of Zn, and may be useful in this role in other battery chemistries, such as metal-air or redox flow batteries due to its ability to inhibit the formation of a passivation layer. The inventive electrolyte composition are useful in all manner and types of electrochemical cells, and batteries comprising one or more alkaline electrochemical cells which include a manganese comprising electrode.

Alkaline electrochemical cells, and batteries comprising one or more alkaline electrochemical cells (herein also referred to as "alkaline batteries") are advantageously used with the electrolyte compositions taught herein and exhibit both extremely high energy density and low cost per kWh compared to many other types of batteries, albeit those with different electrolyte compositions. Rechargeable alkaline electrochemical cells and alkaline batteries with the electrolyte compositions taught herein are amongst the preferred embodiments of the present invention and may be useful in any of a number of known applications wherein a high ratio of potentially be used in grid storage or electric vehicle applications.

Prior to the present invention, no known electrolyte formulation has allowed for the development of rechargeable alkaline manganese dioxide-zinc batteries with full depth-of-discharge (DoD) capability. All known attempts at developing this type of rechargeable cell have required limiting the depth of discharge to 10% of the two-electron capacity, dramatically reducing the energy density of the system. In contrast thereto, the disclosed electrolyte formulation enables significant improvements in the depth of discharge of the two-electron capacity, typically at least 20%, 30%, and up to about 60% and perhaps more; such a depth of discharge is not believed achievable with most prior art rechargeable types of electrochemical cells, and in particular over a plurality of charge/discharge cycles, e.g, 20 or more, preferably 40, 50, or more charge/discharge cycles. Utilizing the electrolytes according to the invention in alkaline batteries which utilize manganese dioxide working electrodes with Zn counter electrodes presents the possibility for rechargeable batteries with extremely high energy density and relatively low cost per kilowatt-hour. Under normal circumstances, $MnO_2$ counter electrodes cycled against Zn suffer from zinc poisoning, where $ZnMn_2O4$ forms during the 2nd-electron discharge instead of $Mn(OH)2$. This phase is electronically and ionically insulative, resulting in reduced cell performance and the formation of additional $ZnMn_2O_4$ with each cycle.

The preferred electrochemical cells comprise a cathode active material comprising manganese. The manganese comprises one or more of: Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof. The manganese of the cathode active material may further comprise one or more of Pb, B, Al, Ga, Zn, Ni, Pd, In, Ag, or any combination thereof, i.e., as a dopant, or as a coating agent.

Electrochemical cells comprise an anode formed of an anode active material which is an electrically conductive or semiconductive materials, e.g., metals, metal oxides, metal alloys, metal composites, semiconductors, or the like. Common anode materials include Si, Sn, Al, Ti, Mg, Fe, Bi, Zn, Sb, Ni, Pb, Li, Zr, Hg, Cd, Cu, $LiC_6$, mischmetals, alloys thereof, hydrides thereof, oxides thereof, or composites thereof. Preferred are Cd, Zn, Fe and NiMH. Anode materials (i.e. zinc) may even be sintered. In the preferred embodiments of the present invention the anode comprise zinc.

Electrodes, viz., anode or cathodes, of the invention may include any conventional additive material(s) known for use in primary (non-rechargeable) and secondary (rechargeable) cells. Without limitation such include current enhancing additives such as carbonaceous materials in any of a variety of forms, i.e. carbon black, graphite, graphene, and the like. Other fillers and additives such as polymers, especially Teflon® type materials (polytetrafluoroethylene) may form part of an electrode.

The electrodes may include a supporting structure such as a plate, mesh, rod or other construction upon which the anode active material or cathode active material is supported. The supporting structure may be formed of a material such as a metal or metal alloy which is electrically conductive but such is not essential and the supporting structure may have poor electrically conductive properties.

The electrolytes of the invention are preferably largely aqueous (preferably comprise at least about 50% wt. water, more preferably at least about 75% wt., 80% wt., 85% wt., 90% wt., 95% wt. water and necessarily also contains the essential KOH and LiOH, in the required ratios discussed herein. The pH of the electrolyte is alkaline and is preferably in the range of at least 7.5 to about 16, and more preferably has a pH of at least about 8, preferably (and in order of increasing preference) at least about 85, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 15.75, and 16. In particularly preferred embodiments the electrolyte exhibits a subrange of the above pH limits, and most preferably exhibits a pH of about 10 to about 16.

The electrolytes of the invention may comprise additional constituents which are conventionally known in the art to be useful in alkaline electrochemical cells and alkaline batteries of the rechargeable type, in addition to the required LiOH to the KOH being necessarily present in the required, or preferred concentrations and molar ratios. Useful electrolytes include mixtures of materials such as aqueous solutions of alkaline agents. Minor amounts of the aqueous solutions may be one or more additives, e.g. one or more organic solvents, one or more surfactants, one or more buffers, e.g., borates, phosphates. The electrolyte may also be polymeric or gel in nature, but preferred are largely aqueous liquid electrolytes. In addition to the essential LiOH to the KOH in the required concentrations and ratios taught herein, additionally the electrolytes may further include one or more further alkaline materials, such as NaOH, CsOH, RbOH or combinations thereof. The electrolytes can optionally include further other salts to modify the total ionic strength of the electrolyte, i.e., KF or $CA(OH)_2$. However in preferred embodiments the electrolytes in a largely aqueous electrolyte solution consist primarily of the required LiOH to the KOH, and only thereafter may additional further alkaline materials be present. In certain especially preferred embodiments, the required LiOH and KOH comprise at least 90% wt/wt, more preferably 95% wt/wt of alkaline species present in the liquid electrolyte solutions and in particularly preferred embodiments the required LiOH and KOH are substantially or the sole alkaline materials. Such one or more further optional constituents which may be present in the electrolyte typically comprise no more than 25% wt., more preferably not more than 20% wt 15% wt, 10%, or 5% wt. of the electrolyte composition, when one or more such optional additives are present.

The electrochemical cells and/or alkaline batteries may be of any type or configuration, e.g., may be cylindrical, button cell, bobbin, planar, prismatic, flooded, dry, or any other configuration or type.

In preferred embodiments electrochemical cells and/or alkaline batteries comprising an electrolyte having LiOH to the KOH in the required, or preferred concentrations and/or, (preferably 'and') molar ratios exhibit behavior when recharged over a plurality of charge/recharge cycles. In a preferred embodiment such a rechargeable battery or electrochemical cell may be charged/discharged for at least 100 cycles, preferably for at least (in order of increasing preference) 200, 300, 400, 500, 600, 700, 800, 900, 1000, 1100, 1200, 1300, 1400, 1500, 1600, 1700, 1800, 1900, 2000 cycles, or even more, which still maintaining acceptable performance characteristics. A particularly preferred embodiment of a rechargeable alkaline battery exhibits having an $MnO_2$ cathode, over a 500 or more (and up to about 1000, or 2000) charge/discharge cycles, having a depth of discharge up to 400 mAhr/g on the $MnO_2$ for about an initial 500 cycles, and beyond preferably also exhibits a DoD of up to 350 mAhr/g for about to 1000 cycles.

Alternately, in a preferred embodiment an alkaline battery according to the invention exhibits) not more than about 0.5% (averaged) degradation of its (averaged) initial capacity for at least 100 cycles, preferably for at least 500 cycles, more preferably for at least 500 cycles, still more preferably for at least 750 cycles, more preferably for at least 1000 cycles, yet more preferably for at least 1250 cycles. The (averaged) initial capacity is measured by determining the average over the $10^{th}$ through $20^{th}$ initial charge/recharge cycles. Thereafter this measurement is compared to the average measured over the initial 100 cycles, or over the average of the initial 250 cycles, etc. as appropriate. The (averaged) degradation for such later number of cycles is compared to the determined (averaged) initial capacity. Preferably according to this embodiment the less than about 0.5% (averaged) degradation of its (averaged) initial capacity is more preferably (and in order of increasing preference) not more than 0.45%, 0.4%, 0.35%, 0.3%, 0.25%, 0.2%, 0.15%, 0.1% or even less of the (averaged) degradation of its (averaged) initial capacity.

In another preferred embodiment an alkaline battery according to the invention exhibits) not more than about 5%, 2.5%, 1% and particularly preferably not more than about 0.5% (averaged) degradation of its (averaged) initial capacity for at least about 40, 50 or 60 or more charge/discharge (or "recharge/discharge") cycles, preferably at least 100 said cycles, preferably for at least 250 said cycles, more preferably for at least 500 said cycles, still more preferably for at least said 500 cycles, still more preferably for at least 750 said cycles, more preferably for at least 1000 said cycles, yet more preferably for at least 1250 cycles, but may. The (averaged) initial capacity is measured by determining the average over the $10^{th}$ through $20^{th}$ initial charge/recharge cycles, however the (averaged) degradation of its (averaged) initial capacity may increase with increasing numbers of charge/recharge cycles to which the alkaline battery is subjected. (I.e., an alkaline battery may exhibit 0.2% or less (averaged) degradation of its (averaged) initial capacity for at least 100 cycles, but may exhibit an increased (averaged) percent degradation of its (averaged) initial capacity in successive cycles. Still, preferably according to this further embodiment the less than about 0.5% (averaged) degradation of its (averaged) initial capacity is more preferably (and in order of increasing preference) not more than 0.45%, 0.4%, 0.35%, 0.3%, 0.25%, 0.2%, 0.15%, 0.1% or even less of the (averaged) degradation of its (averaged) initial capacity in one or more of the sequence of charge/recharge cycles.

EXAMPLES

Electrolyte compositions within the ambit of the present invention, were formed and evaluated in various alkaline electrochemical cells and/or alkaline batteries. Also formed and similarly evaluated were electrolyte compositions which fell outside of the compositions describes as falling with the scope of the present invention in these are presented as comparative examples.

In the Examples a Bi-doped $MnO_2$ cathode material was synthesized using a simple hydrothermal method and cycled in a binary KOH—LiOH electrolytes within a range of relative molar concentrations. The reported results show that, at a KOH:LiOH molar ratio of 1:2.5-3.5, and especially at the preferred molar ratio of 1:3, both proton insertion and lithium insertion occur, allowing access to a higher fraction of the theoretical capacity of the $MnO_2$ while preventing the formation of $ZnMn_2O_4$. This enabled a capacity of 360 mAh/g for over 60 cycles, with cycling limited more by anode properties than traditional cathodic failure mechanisms.

The structural changes occurring during cycling were characterized using electron microscopy and in-situ synchrotron Energy-Dispersive X-Ray Diffraction (EDXRD) techniques. This binary electrolyte composition of the invention shows exceptional cyclability and capacity and can be used in the place of conventionally known alkaline batteries and in applications which utilize alkaline electrochemical cells and alkaline batteries, particularly of the rechargeable type. Use of the electrolytes of the invention in such devices is expected to drastically improve their performance characteristics, including improved DoD, and useful service life as evidenced by increased cycle life, thus making such alkaline electrochemical cells and alkaline batteries highly advantageous to use in a virtually all known applications which may benefit from this new energy storage technology.

$MnO_2$ Synthesis

For use as an active cathode material, a modified bismuth doped $\beta$-$MnO_2$ (MBDB), was prepared by a thermal decomposition process with a mixture consisting of $Mn(NO_3)_2 \cdot 4H_2O$ (ex Sigma-Aldrich) and $Bi(NO_3)_3 \cdot 5H_2O$ (ex. Sigma-Aldrich).

Two different solutions were prepared:
Solution 1) 50 g of $Mn(NO_3)_2 \cdot 4H_2O$ in 80 ml $H_2O$.
Solution 2) 4.27 g of $Bi(NO3)3.5H2O$ in 18.6 ml $H_2O$ and 6.4 ml $HNO3$.

Each of the foregoing Solutions 1) and 2) were separately formed first to ensure full dissolution of the precursors before being mixed together. The final solution was formed by combining Solutions 1) and 2) in a suitable laboratory beaker and mixing them together utilizing a magnetic stirplate while subjecting the mixture to heat which was incrementally increased during mixing with steps of 5° C./min to an final end temperature of 125° C./min. The evolution of oxidation was visually observable through color changes of the solution. It was observed that end oxidation state (4+) resulted in a black colored solution, which was kept in vacuum at 125 5° C. overnight to ensure that all NOx gases produced from the decomposition of nitric acid were eliminated. Subsequently, the sample was moved from the vacuum out after 12 hours and baked at 3255° C. for 5 hours in a conventional laboratory oven. Finally, the dried and solid modified bismuth doped $\beta$-$MnO_2$ (MBDB) was ground using mortar and pestle to break up the agglomerates of material.

An identical process as above was utilized to produce an undoped $\beta$-$MnO_2$ (pyrolusite) material however the solutions used were:

Solution 1) 50 g of $Mn(NO_3)_2 \cdot 4H_2O$ in 80 ml $H_2O$.
Solution 2) 18.6 ml $H_2O$ and 6.4 ml HNO3.

All subsequent process steps were otherwise identical to produce the undoped $\beta$-$MnO_2$ (pyrolusite).

Electrochemical Techniques

After production of MBDB powder, the electrodes were mixed with the following identified conductive additives and a Teflon® emulsion (ex. Sigma Aldrich) ("PTFE") and dried in a vacuum oven at 125° C. for 1 hour. Two separate sets of additives were used: graphite (provided as Timcal® KS6) and carbon black (provided as Timcal® Super C). Electrodes were formed from the following compositions:

"graphite" electrodes: 45% wt/wt MBDB, 45% wt/wt Timcal® KS6, and 10% wt/wt PTFE "carbon black" electrodes: 60% wt/wt MBDB, 30% wt/wt/Timcal® Super C, and 10% PTFE.

After the electrodes were cast and dried, they were embedded onto a perforated Ni mesh and pressed using a pressure of 138 MPa to calendar the electrodes. The pressed electrodes were then assembled into planar cells, using acrylic plates held together with screws to maintain compression. The counter electrode was Zn metal plate. The separator used was 1 layer of a polyvinyl chloride sheet and 2 layers of nonwoven cellulose (supplied as FV-4304, Freudenberg LLC). After assembly, the cells were immersed in a small sealed beaker of electrolyte and cycled, either at a C/3 rate, a C/20 rate, or a C/4.2 rate, as described following. Constant current rates were calculated with a $MnO_2$ capacity of 616 mAh/g. The voltage range used was $1.8 > V > 0.4$. At the end of constant current charging, a constant voltage of 1.8 V was applied until the current dropped to 10% of the maximum constant current value. The cells were cycled using a MTI BST8-3 Battery Analyzer. Electrochemical impedance spectroscopy studies were carried out on these cells using an AC amplitude of 10 mV and a frequency range from 10 mHz to 10 kHz, using a Solartron 1260 equivalent circuit model was applied to EIS measurements, using a standard Randles circuit. $R_s$ represents the resistance of the cell, including electrolyte and ohmic impedance. $R_{ct}$ represents the charge transfer resistance occurring at the surface of the electrode. The constant phase element (CPE) accounts for the double layer capacitance. $Z_w$ represents the Warburg resistance from ionic diffusion in the $MnO_2$ bulk, which originates from the diffusivity of both protons and lithium ions in our case. The CPE is defined by two constraint parameters: CPE-T, the capacitance from an ideal double-layer capacitor, and CPE-P, a measurement of surface tortuosity.

SEM & XRD

Scanning electron microscopy micrographs were produced using a Philips XL 30 Environmental scanning electron microscope (ESEM), operated at an accelerating voltage of 20 kV. Ex-situ XRD measurement were performed via powder diffraction XRD (pXRD) techniques, acquired using a Bruker D8 advanced diffractometer with a Bragg-Brentano $\theta$-$2\theta$ geometry and Cu K$\alpha$ source ($\lambda$=1.54). The samples were scanned from 10 to 80 degree at a scan rate of $0.0125°$ $s^{-1}$.

EDXRD

A small beaker cell, printed using a Form 1 3D printer (ex. Formlabs), was assembled. The printed photolithography resin was used because of its demonstrated base stability and x-ray transparency. The printed photolithography resin was confirmed to be of high x-ray transparency. The electrode was cycled under non-compression conditions in a 1M KOH+3M LiOH electrolyte, against a Zn plate counter electrode. A C/4.2 rate was used, without an initial C/20 cycle. Cycling conditions were otherwise identical to those described previously. Constant current-constant voltage battery discharge was done using an MTI BST8-3 Battery Analyzer. EDXRD experiments were conducted at the National Synchrotron Light Source (NSLS) on the 7-pole superconducting wiggler beamline X17B1 at Brookhaven National Laboratory (BNL). During battery testing, an incident X-ray beam was fired at the battery being tested, and the diffracted beam was detected at a fixed angle 2-theta=3°. The collimation slits were set to control the sizes of the incident and scattered beams, whereby the intersection of the two beam cross-sectional areas defined a gauge volume (GV). The careful positioning of the GV allowed diffraction data to be collected from a spatially well-defined location. The collimation slits were set for values of di=50 μm and ds=100 μm. This produced a GV with a flat parallelepiped shape: 50 μm in the x1-direction, approximately 1.4 mm in the x2-direction, and 2 mm in the x3-direction. 27 The battery was moved using an X-Y-Z stage to scan the GV across the cathode, collecting EDXRD data at 366 μm intervals, covering the thickness of the cell cathode with 3 individual scans. Data was collected at each point for 1 minute as the cell was cycling. The incident beam was white beam radiation with an energy range of ~20-200 keV. Attenuation of the beam while traveling through the cell was minimal above 50 keV, where diffraction data was analyzed. The EDXRD detector was a standard cryogenically cooled high resolution Canberra intrinsic Ge detector. The cryostat was configured for operation in an inclined angle operation. The Ge single crystal of the EDXRD detector was 1 cm thick, in order to enhance high absorption efficiency of high energy X-rays (about 90% at 100 keV). The detector was mounted on the arm of a Huber diffractometer, with a lead shielded diffraction beam path to attenuate extraneous X-rays scattered in the white beam radiation hutch. 27,28 A digital signal processor and an 8192-channel multichannel analyzer were used with the detector. X-ray energy calibration was performed using $LaB_6$ and $CeO_2$ standards.

Figure 1A:
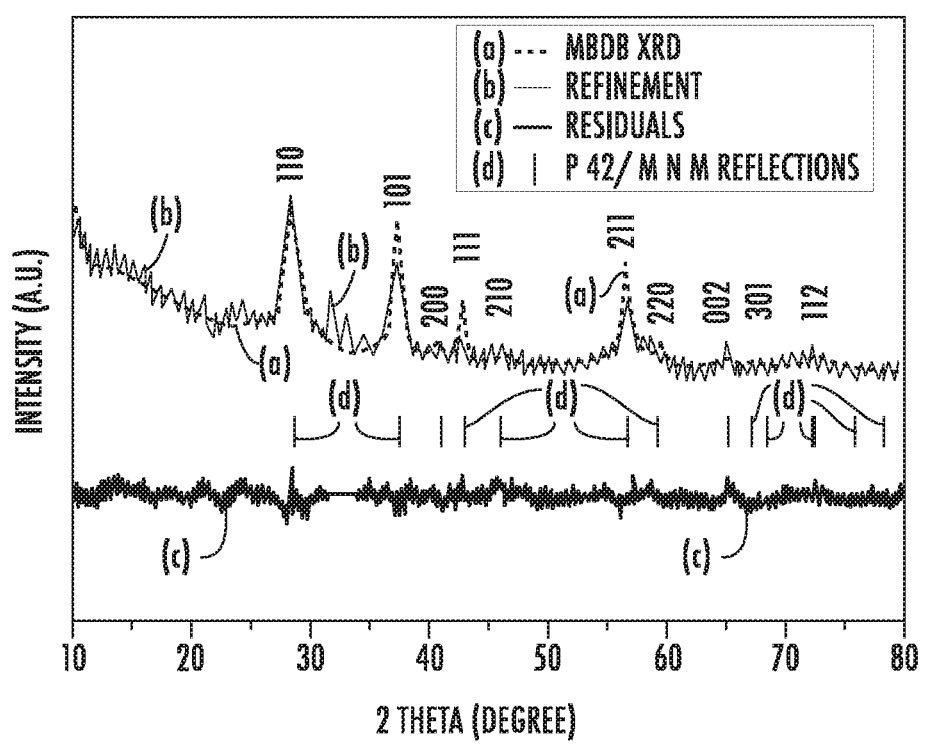
FIG. 1(a) illustrates an ex-situ XRD spectra of an electrode composition.
Figure 1B:
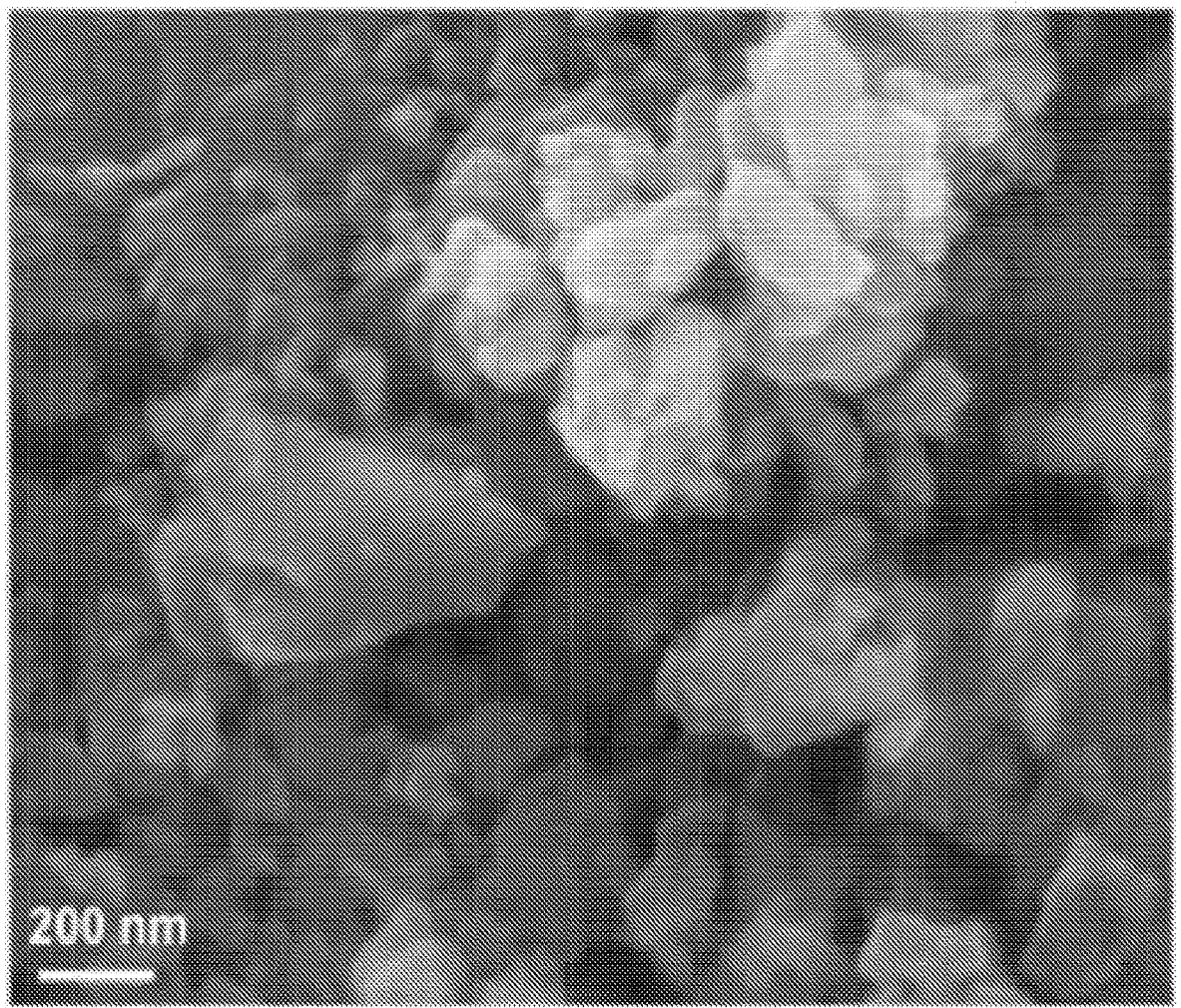
FIG. 1(b) is a scanning electronic micrograph (SEM) of an electrode composition.

XRD spectra and scanning electron micrographs of the synthesized MBDB powder are shown in FIGS. 1(a) and 1(b). A Rietveld refinement was conducted in order to elucidate the structure of the material and to better estimate the Bi:Mn stoichiometry. The refinement was performed (using FullProf software). From FIG. 1(a), the peaks at 31~34° are attributed to a $Bi_2O_3$ impurity (ICSD#417638), and thus this region is excluded to get a more precise refinement fit. The rest of the peaks were well matched with $\beta$-$MnO_2$ (ICSD#73716). These results showed that bismuth atoms replaced 3.5% of the manganese atoms in the (0,0,0) position. The oxygen atom is located at (0.3046, 0.3046, 0), and has occupancy of 2, with Rp and Rwp values of 9.8 and 15.4, respectively. The scanning electron microscope (SEM) micrograph image (FIG. 1b) indicated that the MBDB powder consists of agglomerated particles in a 50 to 100 nm diameter range. These results show that the synthesis method was able to produce a β-$MnO_2$ material with a small particle size and significant amounts of Bi dopants included in the $MnO_2$ structure.

Figure 2A:
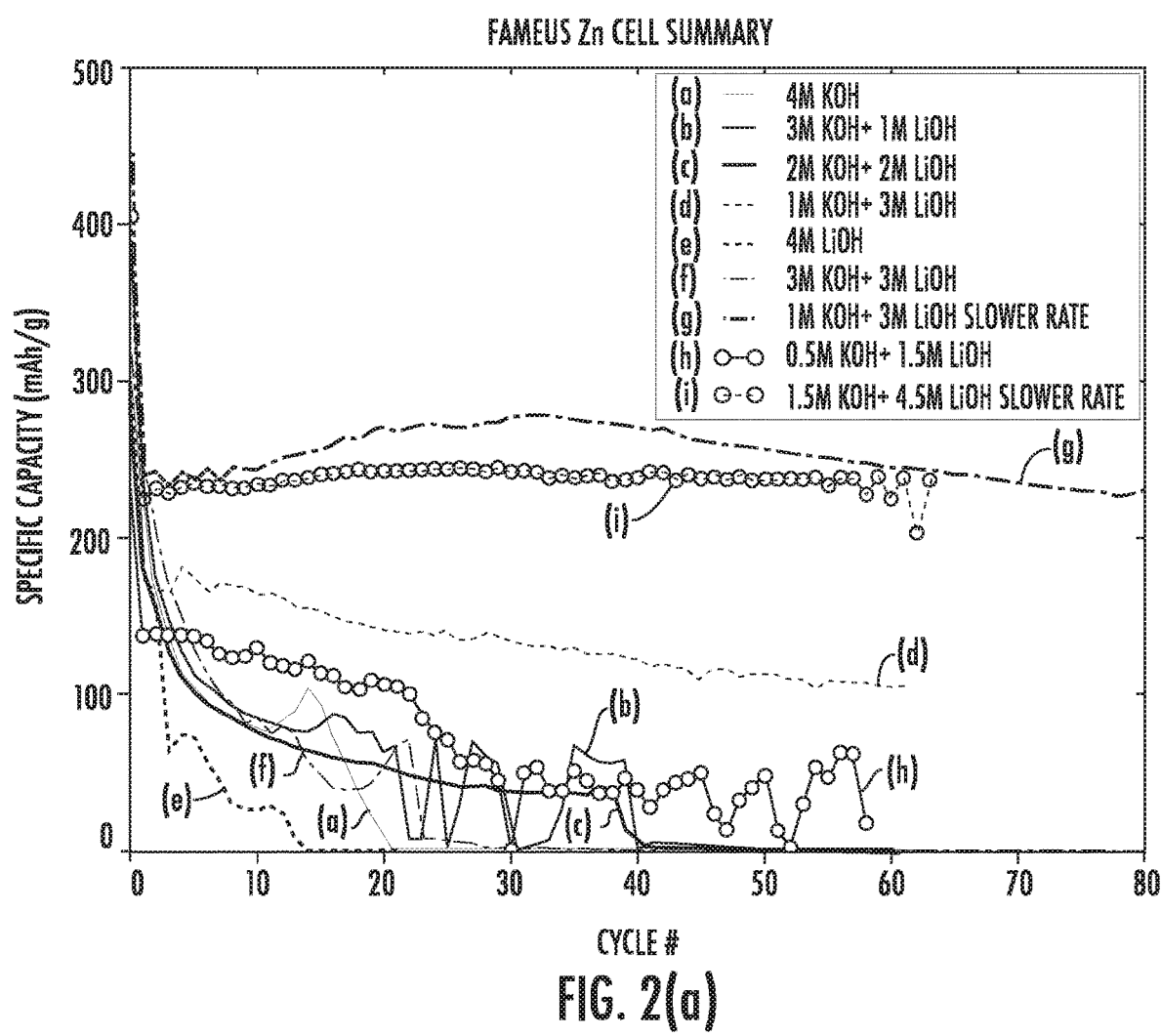
FIG. 2(a) depicts results of the charge/discharge characteristics of electrolytes comprising mixtures of KOH and LiOH in a wide composition range, subjected to a first protocol of charge/discharge cycles and intermediate recharging.
Figure 2B:
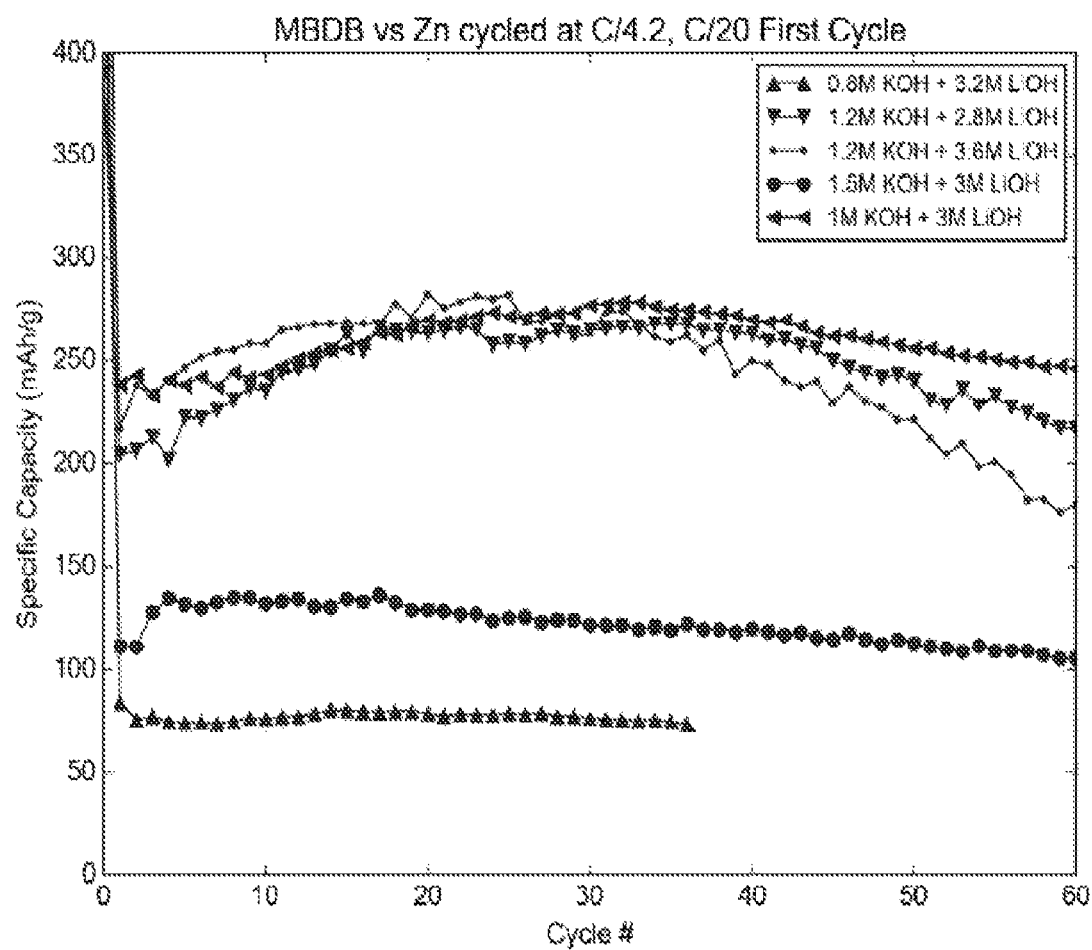
FIG. 2(b) depicts results of the charge/discharge characteristics of electrolytes comprising mixtures of KOH and LiOH in a wide composition range, subjected to a second protocol of charge/discharge cycles and intermediate recharging.

Binary electrolytes made up of a mixture of KOH and LiOH in a wide composition range, from 4M KOH to 4M LiOH, were tested at a C/3 rate. Subsequently, a second set of tests was performed in a more narrow composition range with slower rates, initially discharging and charging the cell at a C/20 rate for the first cycle, and subsequently charging it at a C/4.2 rate. These results are shown in FIGS. 2(a) and 2(b) respectively. More specifically FIG. 2(a) illustrates an MBDB electrochemical cell cycled at a c/3 rate for the first cycle, and at C/4.2 for subsequent cycles against a Zn plate in a range of different electrolytes (except for the one marked Slower Rate, which was cycled at a C/20 rate for the first cycle and C/4.2 for all subsequent cycles), while FIG. 2(b) illustrates an MBDB electrochemical cell cycled at a C/20 rate or the first cycle, and at C/4.2 for subsequent cycles against a Zn plate in a range of different electrolytes. When cycled at a C/3 rate, the 4M KOH, 3M KOH+1M LiOH and 2M KOH+2M LiOH cells show a similar pattern of behavior, with a rapid and exponential decline in capacity from an initial value of ~350 mAh/g to ~75 mAh/g. The 1M KOH+3M LiOH and 4M LiOH cells, however, show a much smaller drop in capacity with cycling. The 4M LiOH cell fails relatively rapidly due to passivation of the Zn plate, however, as the ZnO passivating film cannot dissolve well in a weak base such as LiOH. 29 The 1M KOH+3M LiOH cell shows a capacity over 100 mAh/g for more than 50 cycles with relatively little fading after the first cycle. Subsequent tests at slower rates in a narrower composition range, shown in FIG. 2(b), demonstrate that the superior performance seen in the 1M KOH+3M LiOH electrolyte cell is localized to a composition range of approximately 1:3 to 3:7 KOH:LiOH. Within this composition range, relatively high capacity is achieved, with a peak value of ~280 mAh/g. If the KOH: LiOH ratio is reduced mechanism for charge storage (when the KOH:LiOH ratio is reduced) or the development of electrochemically inactive hetaerolite (when the KOH:LiOH ratio is increased).

Figure 2C:
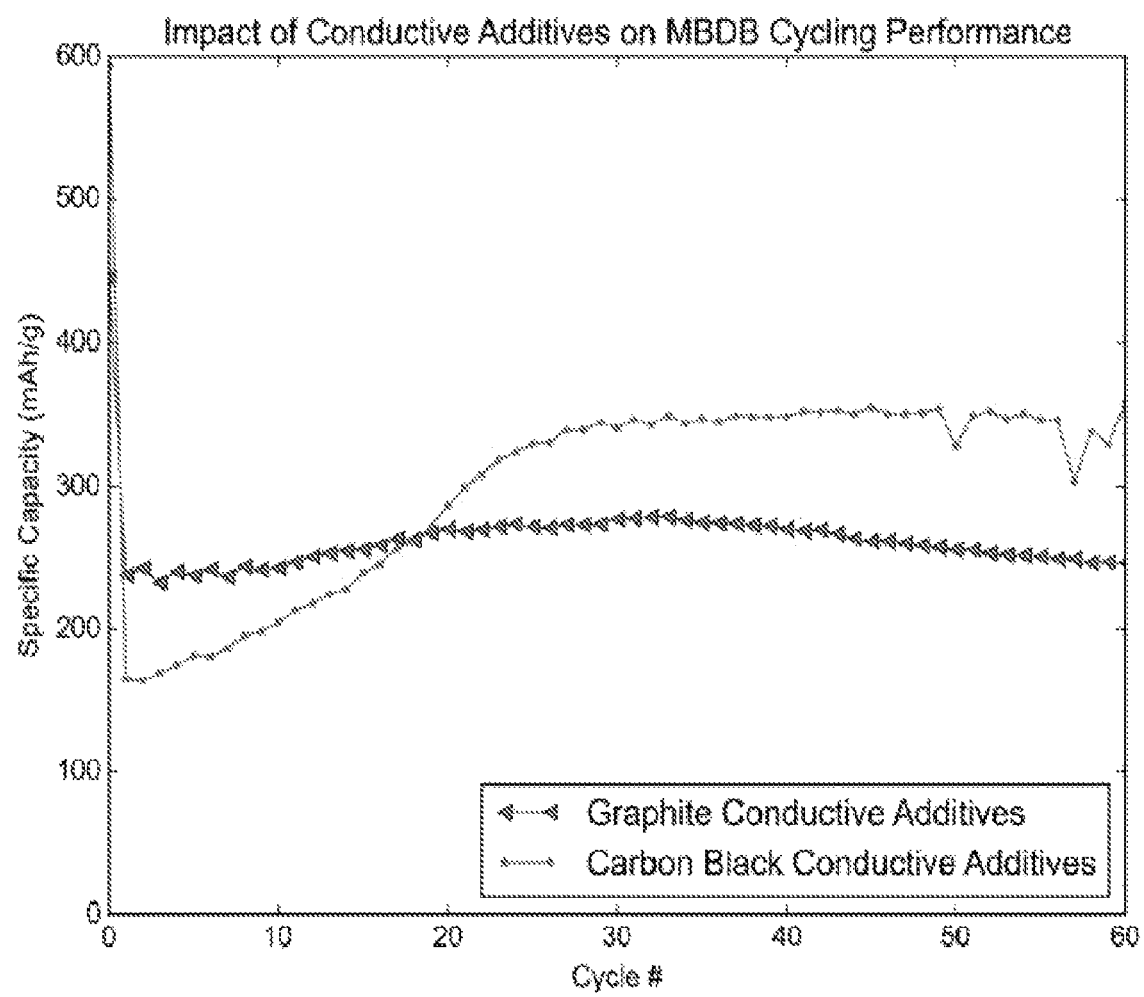
FIG. 2(c) depicts performance characteristics of an electrochemical cell, wherein electrodes comprised a conductive additive.

In order to further improve performance, the graphite conductive additive used in the electrodes was substituted with carbon black, a higher surface area conductive additive. These results are shown in FIG. 2(c). In FIG. 2(c) MBDB cycled in 1M KOH+3M LiOH at a C/20 rate for the first cycle and C/4.2 rate on subsequent cycles, demonstrating the effect of different conductive additives, carbon black and graphite, on capacity Carbon black contained in the electrode was noted to improve overall performance in $MnO_2$ cathodes undergoing deep discharge by reducing the size of the product phase particles and enhancing overall electrode conductivity, at the cost of open circuit potential. Electrochemical cells assembled with carbon black instead of graphite exhibited ~200 mV lower open circuit potential, due to the interaction of the surface groups on the carbon black with the $MnO_2$. However, the higher surface area of the amorphous carbon significantly enhanced interdigitation of the conductive additives and active material, leading to a substantial improvement of the overall capacity of the full cell, increasing capacity from ~280 mAh/g to ~360 mAh/g. This was accomplished without reducing the average potential of discharge; instead, a larger fraction of the electrode capacity was accessible. The capacity of these cells is high enough that performance could not be explained only by lithium insertion into the $MnO_2$. The maximum capacity of lithiated $MnO_2$, for a full first electron reduction to LiMnO2, is 285 mAh/g. After ~60 cycles, the cell fails due to the complete dissolution of the Zn anode.

Figure 2D:
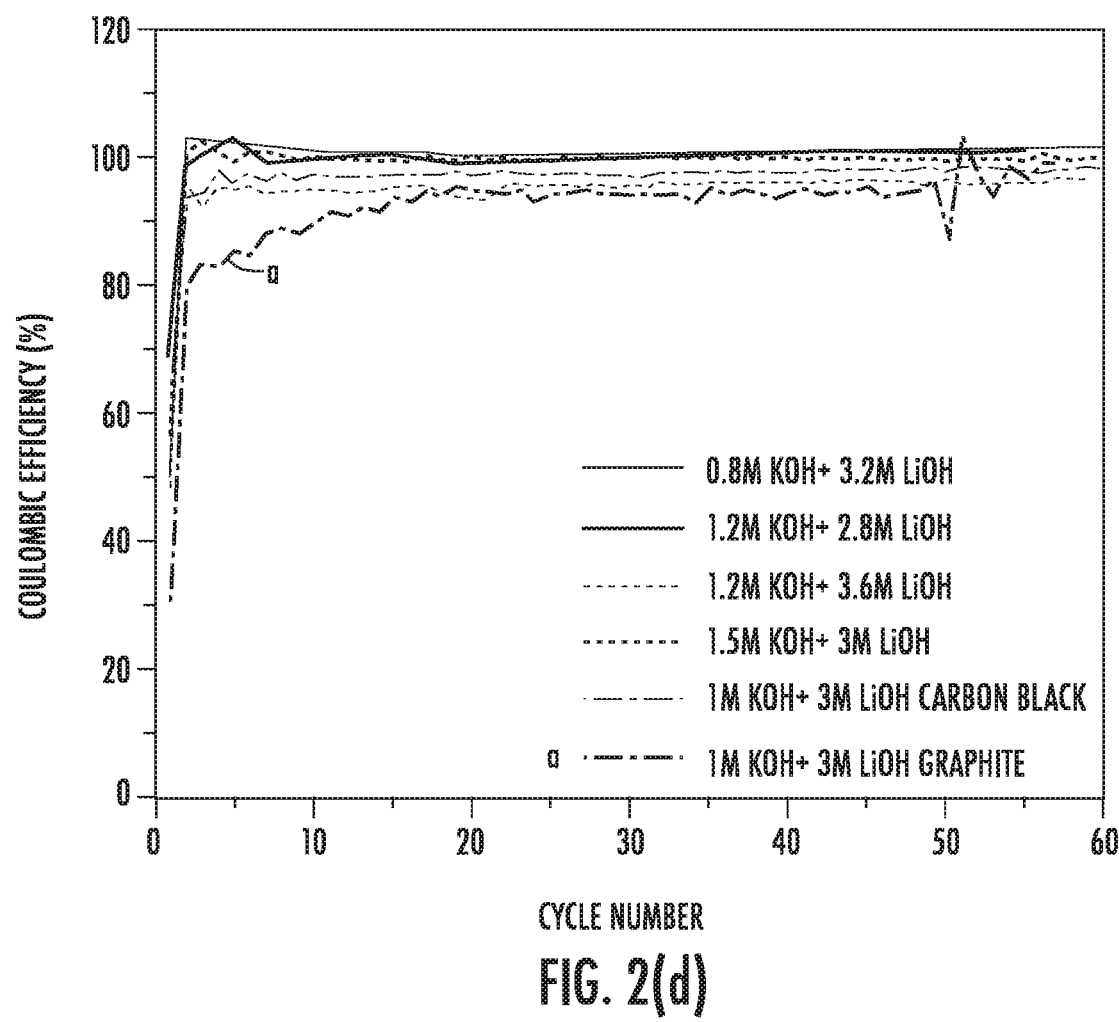
FIG. 2(d) depicts results of an evaluation of the impact of the electrolyte and conductive additives on coulombic efficiency.

The impact of the electrolyte and conductive additives on coulombic efficiency was also examined, as shown in FIG. 2(d). In FIG. 2(d), are depicted the coulombic efficiency of MBDB vs Zn cells in a range of electrolytes and different conductive materials. After the first cycle, the efficiency of every cell was over 80%. The high coulombic efficiency after the initial capacity fade indicated that critical capacity fade mechanisms are stabilized in all cases, but that the electrolyte mix determines the extent of critical fade. Cells with higher capacity, such as those made with carbon black conductive additives, tended to exhibit lower efficiency, although once cell break-in was completed, the efficiency increased to ~95%. Cells made with graphite conductive additives exhibited coulombic efficiency of ~99%. The reduced coulombic efficiency of the cells made with carbon black conductive additives may be due to the poor oxidative stability of amorphous carbon as compared to that of graphite.

A careful galvanostatic analysis of the first discharge of $MnO_2$ cycled with Bi dopants (MBDB) and without (pyrolusite) and in both pure KOH and 1M KOH+3M LiOH electrolytes was performed in order to better understand the impact of both the bismuth dopants and the binary electrolyte on the phase transformation occurring in the cathode was performed. The results are illustrated on FIGS. 3(a) and 3(b). FIG. 3(a) depicts the Specific discharge capacity vs. cycle index of a Comparison of the pyrolusite or MBDB cells with 4M KOH or 1M KOH+3M LiOH cells, cycled at a C/3 rate in a three electrode configuration against Hg/HgO reference electrode (+0.098 V vs. SHE). FIG. 3(b) depicts Discharge potential vs. specific discharge capacity of Comparison of the pyrolusite or MBDB cells with 4M KOH or 1M KOH+3M LiOH cells, cycled at a C/3 rate in a three electrode configuration against Hg/HgO reference electrode (+0.098 V vs. SHE). The results show that the second electron discharge regions of the bismuth-doped cells are much larger than the undoped cells, and tend to occur at a lower reduction potential. This is likely due to the fact that bismuth acts as a redox catalyst, stabilizing the structure and extending the discharge regime. In addition, the presence of bismuth in the structure may promote the formation of Bi—Mn complexes, which inhibit the formation of undesirable products, such as $Mn_3O_4$; this may in turn enhances the overall capacity and retention of the cell. $Mn^{3+}$ is known to dissolve into electrolyte and be reduced to Mn2+. These two dissolved species tend to react with each other, however, and produce $Mn_3O_4$. The presence of bismuth in the structure enables it to dissolve into electrolyte and become a positively charged complex —$Bi_6(OH)_{12}^{6+}$. This compound is known to combine with $Mn(OH)_2^{3-}$ or $Mn(OH)_2^{4-}$, forming Bi—Mn complexes, and thereby inhibiting the formation of the lower-cyclability $Mn_3O_4$ phase. This may explain why a flatter and longer voltage profile regime is present in Bi-doped samples, and why they generate higher capacity. In FIG. 3(b) are also illustrated that cells cycled in the 1M KOH+3M LiOH electrolyte exhibit a less distinct separation between the first- and second-electron discharge plateaus, presumably due to the simultaneous insertion of lithium into the structure providing a secondary reduction mechanism. These results indicate that the use of a binary electrolyte within the balanced KOH:LiOH ratio according to the invention can dramatically enhance the overall cyclability of a MnO$_2$—Zn cell. Such a result is expected from other types of electrochemical cells and batteries as well.

In order to elucidate the effects of this mixed electrolyte on the microstructural changes occurring within the MnO$_2$ cathode, EDXRD was performed on a small-scale cell. This in-situ study was performed at the X17B beamline at the National Synchrotron Light Source at Brookhaven National Laboratory, the results of which are shown below in FIG. 4. The figure depicts the results of in-situ EDXRD studies on a MBDB cell with graphite conductive additives cycled against zinc metal in 1M KOH+3M LiOH. The several vertical arrows indicate peaks associated with particular phases; the horizontal arrows at right indicate the end of a specific charge or discharge stage of the MBDB electrode. The results showed that the MBDB was fully reduced to Mn(OH)$_2$, with peaks apparent at 81.42, 95.2, 128.5, and 141.4 keV. This confirms that proton insertion occurs in the electrode despite the presence of lithium ions. However, the increase in intensity during discharge of the peak at 77.8 keV suggests that LiMn$_2$O$_4$ is also present. The presence of both product phases simultaneously suggests that lithium and proton insertion occur simultaneously during reduction of the cathode. During re-oxidation of the cathode, the MBDB structure that the electrode originally possessed is not recovered. In fact, within the range of photon energies scanned, no crystalline manganese oxide phases are present when the electrode is charged.

A conventional, ex-situ XRD technique was also carried out to characterize the cells with carbon black conductive additives at fully discharged (−1 V vs Hg/HgO) and fully recharged (+0.3 V vs Hg/HgO) states. The results are shown in FIG. 5, which depicts ex-situ XRD patterns of structural evolution of the MBDB composite electrodes with carbon black conductive additives in 1M KOH+3M LiOH at various states of discharge, in which (a) MBDB pristine powder, (b) MBDB pristine electrode, (c) after fully discharge of the 1st cycle, and (d) after full recharge of 1st cycle. As shown in the EDXRD results of FIG. 5, when the electrode is fully discharged, a strong peak appears at 19°, equivalent to the peak at 77.8 keV in FIG. 5, indicated the presence of LiMn$_2$O$_4$. The presence of Mn(OH)$_2$ is similarly indicated. For the fully recharged sample, however, a significant peak appears at 12°. The peak at this angle can be assigned to the birnessite family. The absence of birnessite in FIG. 5 is a product of the limited energy range of the EDXRD scan.

From the foregoing experimental results, it is believed that the schematic of FIG. 6 provides an illustration of schematic the structural transformations occurring in the MBDB material when cycled in 1M KOH+3M LiOH, with the expectation that similar transformation would occur in similar electrolytes having a respective molar ratio of 1 M KOH:2.5-3.7 M LiOH, preferably 1:2.5-3.5 M; M KOH: LiOH. As represented in FIG. 6, the cathode is, in the first cycle, converted into a mixture of LiMn$_2$O$_4$ and Mn(OH)$_2$ at the fully discharged state when the 1M KOH+3M LiOH electrolyte is used. This is followed by a transformation to the layered birnessite structure at the fully recharged state. The (111), (113) and (222) LiMn$_2$O$_4$ peaks, at 19.1, 33.9, and 44.9° respectively, continue to be visible in the fully recharged state, albeit at diminished relative intensity. This suggests that Li extraction from the cathode is not fully completed, presumably due to slow diffusion of Li through the spinel structure. This reaction is frequently considered rate limiting in aqueous Li ion cells. The absence of intermediate Mn$^{3+}$ oxides, such as MnOOH or Mn$_2$O$_3$ is believed to be attributed to the simultaneous first- and second-electron reduction of the cathode, and while not wishing to be limited to the following, the inventors believe that the exclusion of the intermediate Mn3+ phases formed during normal proton insertion in favor of lithiated Mn spinel phases is key to the role of the electrolyte composition in the preferred molar ratios, as is here demonstrated by the 1M KOH+3M LiOH electrolyte used in improving cyclability. The irreversible ZnMn2O4 phase is produced by reaction of these intermediates with solvated zincate ions. The concentration of KOH is still high enough for a full second electron reduction of the MnO$_2$ to occur, resulting in the formation of Mn(OH)$_2$, but the protonated intermediates do not form. By contrast, when cycled in pure KOH, the irreversible phases ZnMn$_2$O$_4$ and Mn$_3$O$_4$ form in addition to Mn(OH)$_2$. While Mn(OH)$_2$ can be oxidized to birnessite, these irreversible phases cannot. Consequently, the fraction of irreversible products increases with each subsequent cycle.

The foregoing experimental results and hypothesis is supported by the SEM images shown in FIG. 7, in which the MBDB cathode is shown before cycling, in the fully discharged state (−1 V vs Hg/HgO), and in the fully recharged state (+0.3 V vs Hg/HgO). In FIG. 7, are presented SEM micrographs demonstrating the change of morphology for MBDB electrodes with 4M KOH electrolyte at (a) after first cycle discharge, (b) after first cycle recharge, (c) after tenth cycle fully discharged, and with 1M KOH+3M LiOH electrolyte at (d) after first cycle discharge, (e) after first cycle recharge, (f) after tenth cycle fully discharged.

For the cell with 1M KOH+3M LiOH, in the fully discharged state, the electrode was highly homogeneous, with 1 μm rounded particles of manganese hydroxide-coated carbon black. During discharge, manganese dissolved and reprecipitated onto the conductive additives in the electrode as part of the Mn$_{3+}$/Mn$_{2+}$ reduction, with the size of the product particles being limited by the electrical conductivity of the product phase. A similar effect occurred during the oxidation of the cathode active material. When the electrode was recharged, the electrode appeared to be mostly composed of rounded, small particles with a diameter of around 50 nm, which appear to be highly agglomerated. After 10 cycles in the fully discharged state, the particle size was reduced to a 20 nm diameter, with a more discrete morphology. However, when the cell was cycled with only KOH as an electrolyte, the electrode was no longer homogeneous in the discharged state. Instead, large hexagonal particles with a 5 um diameter are produced, coupled with much smaller, ~50 nm rounded particles. This was a radical change from the initial structure of the MBDB particles. After subsequent oxidation of the electrode, larger agglomerated particles begin to form, creating void spaces in the previous contiguous electrode. By the tenth cycle, these agglomerated particles of electrochemically inactive material, presumably ZnMn$_2$O$_4$, took up a significant fraction of the electrode's volume. The combination of the formation of inactive phases and physical disruption of the electrode appear to both contribute to the capacity fading of the cell.

However, the microstructural and morphological changes of the MBDB cell cycled in 1M KOH+3M LiOH is much more homogeneous than the pure KOH cell, which appears to be a reason for the far superior capacity retention of the binary electrolyte. The more homogeneous morphological changes result in the decrease of formation of cracks and holes formed in the electrode, which appear to also enhance cycle life for the cell. The electrodes shown in FIG. 7 were also studied via energy-dispersive X-ray spectroscopy (EDX). The electrode cycled in 4M KOH showed a significant quantity of Zn, with a Zn:Mn atomic ratio of 1:8.11. This suggests that as much as ~24.7% of the MnO$_2$ in the electrode has been converted into $ZnMn_2O_4$. However, the cell cycled in 1M KOH+3M LiOH showed no Zn present, suggesting that the formation of $ZnMn_2O_4$ had been completely averted.

The electrochemical impedance parameters of the $MnO_2$—Zn cell was also characterized so to understand its electrical properties. Electrochemical impedance spectroscopy (EIS) measurements were performed with three-electrode cell configurations, the results of which are shown in FIG. 8. The results were fitted to a standard Randles circuit to derive the electrochemical impedance characteristics of this system, which are shown on the following Table 1, which indicates the fitting parameters for the EIS results.

TABLE 1

| Sample ID | State | $R_s$ (Ω) | $R_{ct}$ (Ω) |
|---|---|---|---|
| MBDB-4M KOH | As Prepared | 0.029 | 0.183 |
| MBDB-4M KOH | $10^{th}$ cycle | 0.068 | 0.583 |
| MBDB-1M KOH + 3M LiOH | As Prepared | 0.054 | 0.544 |
| MBDB-1M KOH + 3M LiOH | $10^{th}$ cycle | 0.034 | 0.538 |

As a review of the depicted results of FIG. 8 reveals, When $MnO_2$ was cycled in 1M KOH+3M LiOH instead of 4M KOH, the Ohmic impedance ($R_s$), double-layer capacitance ($C_{dl}$) and charge transfer impedance ($R_{ct}$) were all significantly increased. This suggested that a different reduction reaction, presumably Li insertion, is rate-limiting in cells using a binary electrolyte rather than pure KOH. As a result, the $Mn^{4+}/Mn^{3+}$ redox couple was dominated by the process of Li insertion, rather than proton insertion. Changes in Rs and Rct after cycling were are significantly impacted by our choice of electrolyte. Rs and Rct for the MBDB cell in 1M KOH+3M LiOH electrolyte are slightly smaller at the tenth cycle than in their initial state, suggesting that the surface properties of the electrode did not change significantly with cycling, and the overall shape of the Nyquist plot was quite similar for both points in the cell lifetime. The cell cycled with 4M KOH, showed lower Rct in the pristine state than the cell with 1M KOH+3M LiOH, but by the tenth cycle, the Rct is substantially higher than that of the cell in its pristine state. This result may be correlated to the microstructural changes previously described, as much of the cell has been converted into an electrochemically irreversible and inert phase.

As a result of the foregoing analysis, the inventors have found that the composition of the electrolyte is critical to the performance characteristics of the electrochemical cell, e.g, an alkaline electrochemical cell and/or an alkaline electrochemical battery, as depending on the exact composition of the electrolytes, either proton insertion, lithium insertion, or a combination of both mechanisms can dominate the reduction of the $MnO_2$. When lithium insertion or combined lithium-proton insertion is the dominant reduction mechanism, zinc poisoning reactions do not occur, allowing much greater cycle lifetimes for the cell—up to 60 cycles with minimal loss of capacity, limited primarily by the dissolution or passivation of our Zn plate anode. At the correct electrolyte composition, within the range of 1M KOH:2.5-3.7M LiOH (preferably 1M KOH and 2.5-3.5M LiOH, and especially preferably 1 M KOH:3 M LiOH) both lithium and proton insertion mechanisms occur, enabling full two-electron reduction of the $MnO_2$. We have analyzed the structural and microstructural changes occurring in the electrode using a variety of techniques, including in-situ EDXRD, conventional ex-situ XRD, and scanning electron microscopy techniques. The inventors have shown that this improvement in cyclability is due to the exclusion of intermediate protonated $Mn^{3+}$ phases produced during normal proton insertion in favor of lithiated Mn spinel phases that are not susceptible to Zn poisoning. We have also analyzed the role of bismuth in the cathode material, concluding that bismuth acts as a redox catalyst, stabilizing the structure and extends the $2^{nd}$-electron discharge regime. With appropriate cycling protocols and additives, the capacity of the $MnO_2$ cathode is increased dramatically, up to as much as 360 mAh/g.

Due to the high capacity of the $MnO_2$—Zn cell, the theoretical energy density of a rechargeable alkaline cell could be as high as 100-150 Wh/kg, with extremely low material costs and exceptional safety compared to other rechargeable battery technologies (probably less than 60$ per kilowatt hour).

Rechargeable alkaline batteries using binary electrolytes according to the invention show significant potential for all applications in which rechargeable alkaline batteries are presently used, and in particular, in grid storage and electric vehicles.

The invention claimed is:

1. An electrolyte composition formulated for incorporation into an alkaline battery or alkaline electrochemical cell having a zinc containing electrode, the electrolyte composition comprising a concentration of potassium hydroxide and lithium hydroxide in a ratio or proportion of about 1 molar potassium hydroxide to 2.5-3.7 molar lithium hydroxide (1 M KOH:2.5-3.7 M LiOH).

2. An electrolyte composition according to claim 1 wherein the molar ratio of potassium hydroxide to lithium hydroxide is 1:2.5-3.5.

3. An electrolyte composition according to claim 2, wherein the molar ratio of potassium hydroxide to lithium hydroxide is 1:3.

4. An alkaline battery or alkaline electrochemical cell, which comprises an electrolyte composition according to claim 1, and which contains a zinc containing electrode.

5. An alkaline battery or alkaline electrochemical cell according to claim 4, which exhibits improved depth of discharge ("DoD") performance characteristics.

6. An alkaline battery or alkaline electrochemical cell according to claim 4, which exhibits improved performance characteristics over a plurality of charge/discharge cycles.

7. An alkaline battery or alkaline electrochemical cell according to claim 4, which contains a manganese containing electrode.

8. A method of improving the performance of a rechargeable alkaline electrochemical cell having a zinc containing electrode, which method comprises the step of:

providing to, or including in the construction of the rechargeable alkaline electrochemical cell an electrolyte composition according to claim 1, which electrolyte composition imparts improved performance characteristics to the rechargeable alkaline electrochemical cell.

9. A method of increasing the service life of a rechargeable alkaline electrochemical cell having a zinc containing electrode, which method comprises the step of:

providing to, or including in the construction of the rechargeable alkaline electrochemical cell an electrolyte composition according to claim 1, which electrolyte composition imparts improved performance characteristics to the alkaline battery.

10. A method of increasing the depth of discharge (DoD) of a rechargeable alkaline electrochemical cell having a zinc containing electrode, which comprises the step of:

providing to, or including in the construction of the rechargeable alkaline electrochemical cell an electrolyte composition according to claim 1, which electrolyte composition imparts improved depth of discharge performance characteristics to the alkaline battery.

11. An electrolyte composition formulated for incorporation in rechargeable alkaline electrochemical cells or in rechargeable alkaline batteries having a zinc containing electrode, which electrolyte composition substantially reduces or significantly eliminates the formation of $ZnMn_2O_4$ within the electrochemical cell, wherein the electrolyte composition is an electrolyte composition according to claim 1.

12. An electrolyte composition formulated for incorporation in rechargeable alkaline electrochemical cells or in rechargeable alkaline batteries having a zinc containing electrode, which electrolyte composition substantially reduces or significantly eliminates zinc poisoning and/or zinc passivation failure modes within the cells and/or batteries, wherein the electrolyte composition is an electrolyte composition according to claim 1.

13. A process of charging an electrochemical cell comprising a cathode comprising a cathode active material comprising manganese; an anode comprising zinc; and an electrolyte composition which substantially reduces or significantly eliminates the formation of $ZnMn_2O_4$ within the electrochemical cell, wherein the electrolyte composition is an electrolyte composition according to claim 1.

14. A method of charging a rechargeable electrochemical cell or a rechargeable battery having a zinc containing electrode, which comprises an electrolyte composition according to claim 1, which method includes the steps of: initially charging at a C/20 rate for the first cycle followed by charging at a C/4.2 rate for subsequent cycles.

15. A method of charging a rechargeable electrochemical cell or a rechargeable battery having a zinc containing electrode, which comprises an electrolyte composition according to claim 1, which method includes the steps of:
  initially charging at a C/20 rate for the first cycle followed by a C/3 rate for subsequent cycles.

\* \* \* \* \*